US010248468B2

(12) United States Patent
Arroyo et al.

(10) Patent No.: US 10,248,468 B2
(45) Date of Patent: Apr. 2, 2019

(54) USING HYPERVISOR FOR PCI DEVICE MEMORY MAPPING

(71) Applicant: International Business Machines Corporation, Armonk, NY (US)

(72) Inventors: Jesse P. Arroyo, Rochester, MN (US); Charles S. Graham, Rochester, MN (US); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 14/992,294

(22) Filed: Jan. 11, 2016

(65) Prior Publication Data

US 2017/0199768 A1   Jul. 13, 2017

(51) Int. Cl.
| | |
|---|---|
| G06F 12/00 | (2006.01) |
| G06F 9/50 | (2006.01) |
| G06F 9/455 | (2018.01) |
| G06F 13/42 | (2006.01) |
| G06F 13/40 | (2006.01) |

(52) U.S. Cl.
CPC ........ *G06F 9/5077* (2013.01); *G06F 9/45558* (2013.01); *G06F 13/4022* (2013.01); *G06F 13/4282* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,418,166 B2* | 4/2013 | Armstrong | G06F 11/20 717/168 |
| 8,495,252 B2* | 7/2013 | Lais | G06F 13/404 710/1 |
| 8,612,711 B1 | 12/2013 | Griffin | |
| 9,916,173 B2* | 3/2018 | Tsirkin | G06F 9/45558 |
| 2006/0282624 A1 | 12/2006 | Yokota | |
| 2011/0320652 A1 | 12/2011 | Craddock et al. | |
| 2012/0124574 A1 | 5/2012 | Nagashima et al. | |

(Continued)

FOREIGN PATENT DOCUMENTS

| | | |
|---|---|---|
| GB | 2506684 A | 4/2014 |
| WO | 2005036806 A2 | 4/2005 |

OTHER PUBLICATIONS

Gschwind, Michael. "Optimizing Data Sharing and Address Translation for the Cell BE Heterogeneous Chip Multiprocessor." 2008 IEEE International Conference in Computer Design (ICCD), 2008, pp. 478-485.

(Continued)

*Primary Examiner* — Cheng Yuan Tseng
(74) *Attorney, Agent, or Firm* — Patterson + Sheridan, LLP

(57) ABSTRACT

A method to manage peripheral component interconnect (PCI) memory includes accessing a page table that includes mapped data representing base address register (BAR) space and addresses of PCI devices. The method also includes determining whether a requested address of a PCI device has a corresponding entry in the page table. The method further includes invoking a hypervisor to perform a memory operation to obtain address information of the PCI device upon determining that the requested address does not have the corresponding entry in the page table.

20 Claims, 5 Drawing Sheets

(56) References Cited

U.S. PATENT DOCUMENTS

2012/0185632 A1    7/2012  Lais et al.
2015/0149997 A1*   5/2015  Tsirkin ................ G06F 9/45558
                                                      718/1

OTHER PUBLICATIONS

Krause, et al., "I/O Virtualization and Sharing." PCI-SIG Developers Conference, 2006, pp. 1-26.

* cited by examiner

USING HYPERVISOR FOR PCI DEVICE MEMORY MAPPING

I. FIELD OF THE DISCLOSURE

The present disclosure relates generally to computing systems, and generally to methods and devices to handle peripheral component interconnect (PCI) device memory mapping with a hypervisor.

II. BACKGROUND

A computer may concurrently execute several operating systems. Each operating system may reside in its own logical partition (LPAR), with each LPAR allocated a part of a physical processor, an entire physical processor, or multiple physical processors at the computer. An underlying hypervisor (or partition manager) manages and controls the LPARs. Peripheral component interconnect (PCI) is a system input/output (I/O) bus that provides an interface that enables a processor to communicate with peripheral devices such as storage devices, display devices, etc., through the use of adapters. The hypervisor assigns PCI memory space for each adapter in the system. Each adapter may have a total base address register (BAR) space requirement from hundreds of megabytes to over a gigabyte memory. There is a need to efficiently manage available memory space in a computer system.

III. SUMMARY OF THE DISCLOSURE

According to a particular embodiment, a computer implemented method to manage peripheral component interconnect (PCI) memory using a hypervisor is disclosed. The method includes mapping base address register (BAR) space for PCI devices with entries in a page table. The method further includes associating a page of the page table with a physical memory address of the PCI memory to generate memory mapped I/O (MMIO). The method invokes a hypervisor to perform read/write operations to obtain address information for entry in the page table if an address is not in the MMIO.

According to another embodiment, a data processing system utilizes a hypervisor for managing peripheral component interconnect (PCI) memory. The system includes a processor comprising a logical partition and an adjunct partition, a plurality of PCI devices coupled to the processor via a PCI bus, and a computer-readable storage medium comprising instructions executable by the processor to manage a PCI memory. The processor manages the PCI memory by mapping base address register (BAR) space for the PCI devices with entries in a page table. The processor associates the page table with a physical memory address of the PCI memory to generate a memory mapped I/O (MMIO). If an address is not in the MMIO, the processor invokes the hypervisor to perform read/write operations to obtain address information for entry in the page table.

According to yet another embodiment, a computer program product comprising a computer memory having computer usable program code embodied therewith is disclosed. The computer usable program code includes instructions that are executable by a processor to perform various operations. The operations include accessing a page table that includes mapped data representing BAR space and addresses of PCI devices. The operations also include determining whether a requested address of a PCI device has a corresponding entry in the page table. The operations further include invoking a hypervisor to perform a memory operation to obtain address information of the PCI device upon determining that the requested address does not have the corresponding entry in the page table.

IV. DETAILED DESCRIPTION

Figure 1:
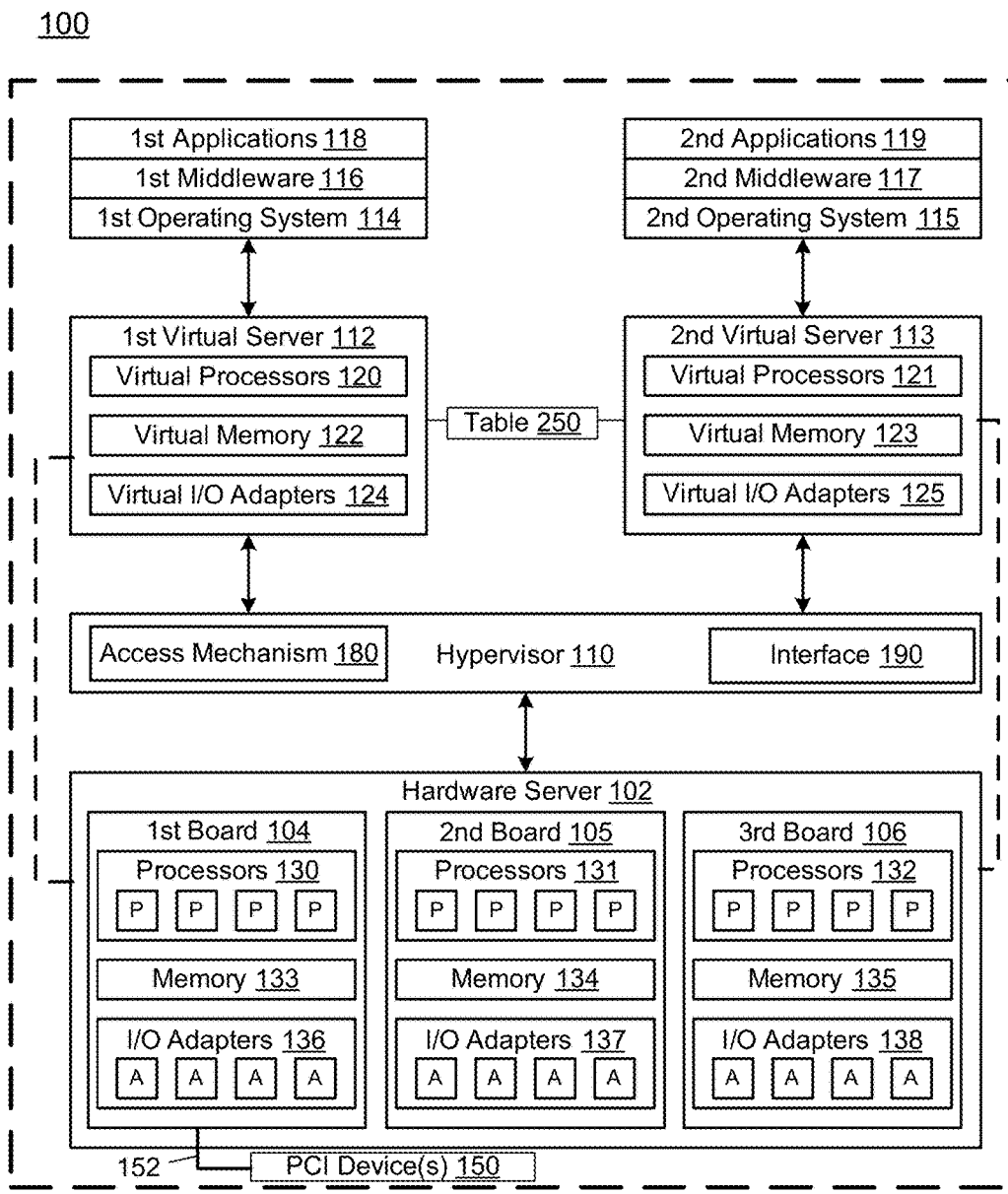
FIG. 1 is a block diagram of a system to implement one or more aspects of an embodiment.

In a computer system running multiple operating systems concurrently, the operating systems reside in corresponding LPARs, with each LPAR allocated a part of a physical processor, an entire physical processor, or multiple physical processors. Additionally, a portion of the computer's memory is allocated to each LPAR. An underlying partition manager, or a hypervisor, manages and controls the LPARs. The hypervisor is typically a part of the system firmware and manages the allocation of resources to the operating systems and LPARs.

Many components in a computer system are connected through an interconnect, such as a shared bus or a point to point communication system. These interconnect systems may allow the communication of data between the components of the computer system. For example, they allow the communication of data from a network interface card (NIC) to a central processing unit or to the system memory. A computer system may have multiple interconnect systems connecting different sets of components. Peripheral component interconnect (PCI) type interconnects may discover attached devices by scanning the entire configuration space of the computer system. Some devices may have device operational registers accessed by memory read and write operations. These devices are referred to as memory mapped and the address space is referred to as memory mapped I/O (MMIO). One or more registers in the configuration space contain the MMIO base address registers (BARs).

The present disclosure discloses a method to address the limited capacity space in a hardware page table by use of a hypervisor. The method is suitable to handle the large BAR requirements for peripheral component interconnect express (PCIe) devices in a Single Root I/O Virtualization (SR-IOV) environment with adjunct partitions. In one embodiment, the hypervisor may allow partitions to access PCI memory space using either a memory mapped I/O (MMIO) access method or with an interface for the partitions to call the hypervisor to perform "reads" or "writes" to a particular address in the PCI memory space.

SR-IOV refers to a specification that allows a PCIe device to appear to be multiple separate physical PCIe devices, by logically dividing a physical adapter port into multiple virtual ports. SR-IOV defines physical functions (PFs) and virtual functions (VFs). Physical functions (PFs) are full-featured PCIe functions, and virtual functions (VFs) are functions that lack configuration resources. It is possible to configure or control a PCIe device via the PF, and the PF has full ability to move data in and out of the PCIe device. VFs only have the ability to move data in and out and VFs cannot be configured.

PCI Express (PCIe) refers to a high-speed serial computer expansion bus standard that has commonly been used to replace the PCI standard, with hardware support for I/O virtualization. In this disclosure, PCIe may be used interchangeably with PCI. PCIe mapping involves mapping a PCIe device into BARs or memory-mapped address space (or other I/O address space) of the computer system. This mapping enables the computer system to address PCIe devices. Drivers or an operating system can program the Base address registers (BARs). During system startup, PCIe devices are usually identified, numbered and then addressed.

Adjunct partitions have been introduced to assist with SR-IOV, or the virtualization of IO resources. An adjunct partition is a type of partition that is more limited than a full, logical partition. An adjunct partition typically runs in a flat, static effective address space and problem state that permits the hypervisor to apply a range of hypervisor and processor optimizations that result in a substantial decrease in system overhead associated with a context switch of the state machine from an LPAR to state data of an adjunct partition. In other respects, an adjunct partition is similar to a full LPAR. For example, an adjunct partition typically can be assigned resources, either physical or virtual, similar to a full LPAR. Unless specified otherwise herein, the term "partition" may be used interchangeably with "adjunct partition," and the term LPAR refers to a full logical partition.

Page tables are data structures in the operating system used to store the mapping between the physical memory pages to virtual memory pages. The pages are typically between 4 KB and 64 KB in size. Some systems support even larger page sizes. Some CPUs and kernels even support multiple page sizes. In one example, a computer system has virtual addresses of at least 32 bits and a 4-KB page size. With a 32-bit address space having one million pages in the virtual address space, the page table must have one million entries. Page tables can be in the form of inverted page tables with one entry per page frame in real memory, rather than one entry per page of virtual address space.

In operation, the hypervisor assigns a range of PCI memory space for each slot or adapter in the system. In one embodiment for an adapter, the PCI memory space is on the order of several megabytes to a few gigabytes, e.g., in the range of 512 MB to 2 GB. In one example with 64-bit virtual addresses, a 4-KB page, and an adapter with 256 MB memory space, an inverted page table would require 65,536 entries. Even with 64 KB pages, the inverted page table would still require 4096 entries.

In embodiments with the adjunct partitions used for SR-IOV adapters, page table data exceeds the available memory space for the hardware page table. One solution may include allocating a larger portion of memory for page table space. However, this approach requires extra overhead, and may not be practical if the memory is not available. Additionally, resources may not be fully utilized if there are adapters that do not require much memory space. It is possible to map the PCI memory space with a page table having a larger granularity (e.g., =>64 KB) to reduce the number of page table entries, but this approach may not be available or suitable for some applications. Another approach is to use logical partitions to map the MMIO space for each use, and then unmap the MMIO space after completion. This approach may result in unsatisfactory performance and is not possible in all environments. In yet another approach using a partition scheme, some MMIO space can be mapped and the pages that are mapped can be kept track of in a separate structure. For an MMIO request to an unmapped page, a page of space can be unmapped when needed to make space for the new mapping. This approach may result in variable performance, in addition to possible complicated structures for the page table plus required time overhead.

Peripheral devices are controlled by writing and reading registers. Most of the time a device has several registers, and they are accessed at consecutive addresses, either in the memory address space or in the I/O address space. Even if the peripheral bus has a separate address space for I/O ports, not all devices map their registers to I/O ports. Most PCI devices map registers into a memory address region. This memory mapped I/O ("MMIO") approach is generally preferred because it does not require use of special-purpose processor instructions. CPU cores access memory much more efficiently using the MMIO approach, and the compiler has more freedom in register allocation and addressing-mode selection when accessing memory.

MMIO uses the same address bus to address both memory and I/O devices—the memory and registers of the I/O devices are mapped to (associated with) address values. When an address of a PCI device is accessed by the CPU with the MMIO approach, a partition issues processor instructions to write/read a memory address that is mapped in the partition page table to the system physical memory address of the PCI memory. Some storage adapters have two main code paths in the storage adapter firmware stack including a performance path and a normal or error recovery path, and the MMIO method can be used for the Performance Path code.

Methods For the Adjunct Partition to Access PCI Memory Space

In one embodiment, an adjunct partition accesses PCI memory either via the MMIO approach or the hypervisor, depending on whether a requested address is in the MMIO mapped region. In this method, a device driver first initiates MMIO, or a request for memory regions to map to the respective I/O device (adapter/slot). The system is provided with interfaces for the partition to call the hypervisor to perform reads or writes to a particular address in the PCI memory space. The hypervisor presents the addressing information relevant to the I/O device to the partition. The partition discovers the device and initializes the BAR space based on the PCI memory space allocation received from the hypervisor. The partition selects (via a preset configuration) which areas of the adapter BAR space are required and calls the hypervisor to enter page table entries for those pages. In one embodiment, the partition maintains an internal map that may be a form of a pair of single address/length size. When the partition elects to read or write from the PCI adapter BAR space, it calls an internal program to determine whether the address is within the MMIO mapped region. The hypervisor presents the LPAR with information regarding how much of the address space is mappable, and in one embodiment, which area(s) of the address space are premapped. The partition may utilize either of the following access method based on whether the desired address is pre-mapped or not mapped.

If the address is in the MMIO mapped region(s), the partition, via an internal method, executes a processor instruction to perform the read/write (cache initiated operation) and returns to the caller. Alternatively, if the address is not in the MMIO mapped region(s), the partition may call the hypervisor to map the address, performing the MMIO access. To do so, the hypervisor first validates the address for ownership/alignment. If the validation succeeds, the hypervisor executes the process instructions, e.g., by performing the read/write (cache initiated operation) to update the partition page table and return the result to the partition. Hypervisor based caching involves integrating caching software at the hypervisor.

Pre-mapping is similar to direct memory access mapping in the address translation that occurs in each mapping. However, pre-mapping is different from direct memory access mapping in that the translation of the virtual address of an I/O device to the bus address is done prior to reading or writing to the buffer. In embodiments with areas of the address space being mappable, there are free range(s) in the address space that can be mapped into.

With the use of the hypervisor for the partition to access PCI memory space, additional page table space is not required and only configuration information is added. Further, it is not necessary to change the driver or user code to handle differing I/O page sizes. In some systems with the use of certain adapters, this feature may be advantageous as adjacent 4 KB pages of the address space may not be used by the same clients, allowing the driver and/or hypervisor to make fine-grained authority checks. Another benefit includes less (or no) overhead for mapping/remapping pages. Additionally, the page table may be configured such that the most frequently accessed address ranges are MMIO mapped for performance. Lastly, the decision mechanism in the partition can be transparent and independent from the bulk of the code in the device driver and the user code.

Referring to FIG. 1, a block diagram of a first embodiment of a system 100, wherein adjunct partitions call the hypervisor to access PCI memory space is shown. The system 100 may include a hardware server 102 that is managed by a hypervisor 110. The hardware server 102 may include hardware resources, such as a first board 104, a second board 105, and a third board 106. While three boards are illustrated in FIG. 1, the number of boards may be increased or decreased based on processing considerations. The boards 104-106 may include processors 130-132, memory 133-135, and input/output (I/O) adapters 136-138. Each of the boards 104-106 may include additional hardware resources (not shown), such as specialized processors (e.g., digital signal processors, graphics processors, etc.), disk drives, other types of hardware, or any combination thereof. The processors 130-132, the memory 133-135, and the I/O adapters 136-138 of the hardware server 102 may be managed by hypervisor 110.

The hypervisor 110 may create and manage logical partitions (LPARs), such as virtual servers 112, 113. A logical partition may be a subset of the resources of the hardware server 102 that is virtualized as a separate virtual server. Each of the virtual servers 112, 113 may have its own set of virtual resources, similar to a physical server. For example, the first virtual server 112 may include virtual processors 120, virtual memory 122, and virtual I/O adapters 124. The virtual server 113 may include virtual processors 121, virtual memory 123, and virtual I/O adapters 125. The hypervisor 110 may map the hardware of the hardware server 102 to the virtual servers 112, 113. For example, the processors 130-132 may be mapped to the virtual processors 120, 121; the memory 133-135 may be mapped to the virtual memory 122, 123, and the I/O adapters 136-138 may be mapped to the virtual I/O adapters 124-125. The hypervisor 110 may manage the selection of portions of the hardware server 102 and their temporary assignment to portions of the virtual servers 112, 113.

The hypervisor 110 may provide an access mechanism 180 to enable the virtual servers (e.g., the virtual servers 112 and 113) to access configuration space associated with each virtual I/O adapter (e.g., the virtual I/O adapters 124 and 125). The hypervisor 110 may engage an interface 190 to perform the MMIO access according to one embodiment. FIG. 1 further illustrates a table that may correspond to the page table 250, as described further herein with respect to FIG. 2. FIG. 1 illustrates a first path to PCI device(s) 150 via a PCI bus 152 (represented by the solid lines between the virtual servers 112-113 and the hypervisor 110) and a second path to the PCI device(s) 150 (represented by the dashed lines between the virtual servers 112-113 and the hardware server 102). The PCI device(s) 150 may correspond to one or more of the PCI device(s) 205-206 illustrated and further described herein with respect to FIG. 1. During operation, a partition (e.g., an adjunct partition of the first virtual server 112 or the second virtual server 113) may access one or more of the PCI device(s) 150 via the first path using address information stored in the page table 250 or may access one or more of the PCI device(s) 150 via the second path using the hypervisor 110.

Figure 2:
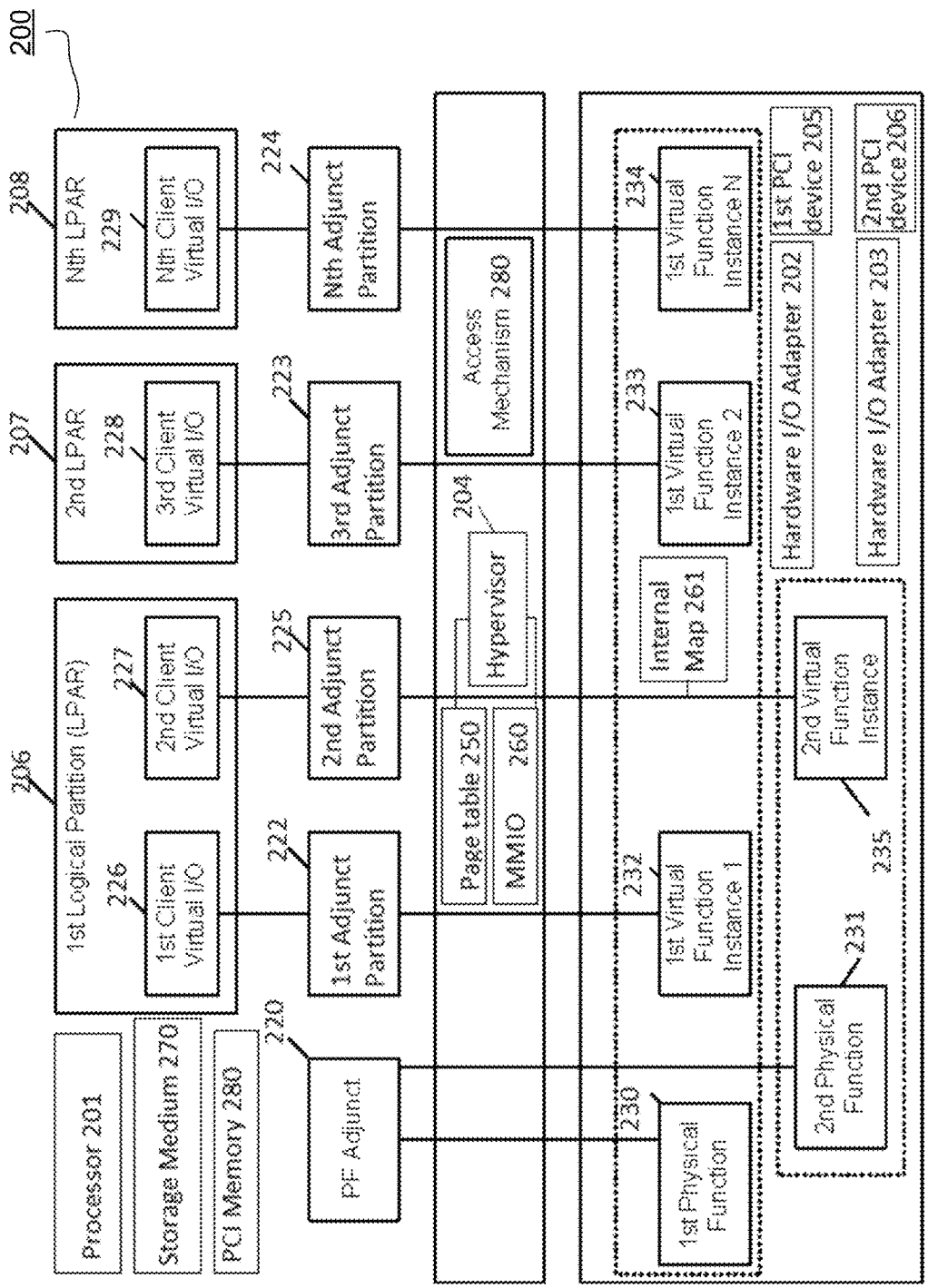
FIG. 2 is a block diagram of a second system to implement one or more aspects of an embodiment.

FIG. 2 shows a block diagram of a system having virtual functions that are hosted by an I/O adapter, as well as adjunct partitions to virtualize IO resources. In the system 200, a hypervisor 204 may enable multiple logical partitions to access virtual functions provided by hardware that includes a hardware I/O adapter 202. For example, the hypervisor 204 may enable a first logical partition 206, a second logical partition 207, and an Nth logical partition 208, to access virtual functions 232-235 that are provided by the hardware I/O adapter 202. To illustrate, the hypervisor 204 may use a first physical function 230 of hardware I/O adapter 202 (with corresponding PCI device 205) to provide a first instance of a first virtual function 232, a second instance of a first virtual function 233, and an Nth instance of a first virtual function 234 to the logical partitions 206-208. The hypervisor 204 may use a second physical function 231 of hardware I/O adapter 203 (with corresponding PCI device 206) to provide a second virtual function 235 to the logical partitions 206-208.

The physical functions 230, 231 may include peripheral component interconnect (PCI) functions that support single root I/O virtualization capabilities (SR-IOV). Each of the virtual functions 232-235 may be associated with one of the physical functions 230, 231 and may share one or more physical resources of the hardware I/O adapter 202. Software modules, such as a physical function (PF) adjunct 220 and virtual function (VF) adjuncts 222-225, may assist the hypervisor in managing the physical functions 230, 231 and the virtual functions 232-235. The VF adjuncts 222-225 may function as virtual device drivers. For example, just as a device driver for a physical device may enable a client application to access the functions of the device, each of the VF adjuncts 222-225 may enable a client application to access the virtual functions 232-235. In the system 200, the VF adjuncts 222 and 224-225 may enable access to the first virtual function instances 232 and 234-235, and the second VF adjunct 225 may enable access to the second virtual function 235. The hypervisor 204 may provide an access mechanism 280 to enable logical partitions (e.g., the logical partitions 206-208) to access configuration space associated with each of the virtual functions 232-235.

The processor 201 may execute instructions stored in storage medium 270 in response to a service request from a partition. The partition may call the hypervisor 204 to perform read or write operations to a particular address in the PCI memory space 280. The hypervisor 204 presents the addressing information relevant to the I/O device, e.g., PCI device 205, to the partition. The partition calls the hypervisor 204 to obtain address information for entry in page table 250. The partition may maintain an internal map 261 in a form of a pair of single address/length size. When the partition elects to read or write from the BAR space of PCI adapter, e.g., I/O adapter 202, the partition may call an internal program to determine whether the address is within the MMIO mapped region 260. The partition may access a PCI device (e.g., the PCI device 205) via a first path using address information stored in the page table 250 or may access the PCI device via a second path using the hypervisor 204.

Figure 3:
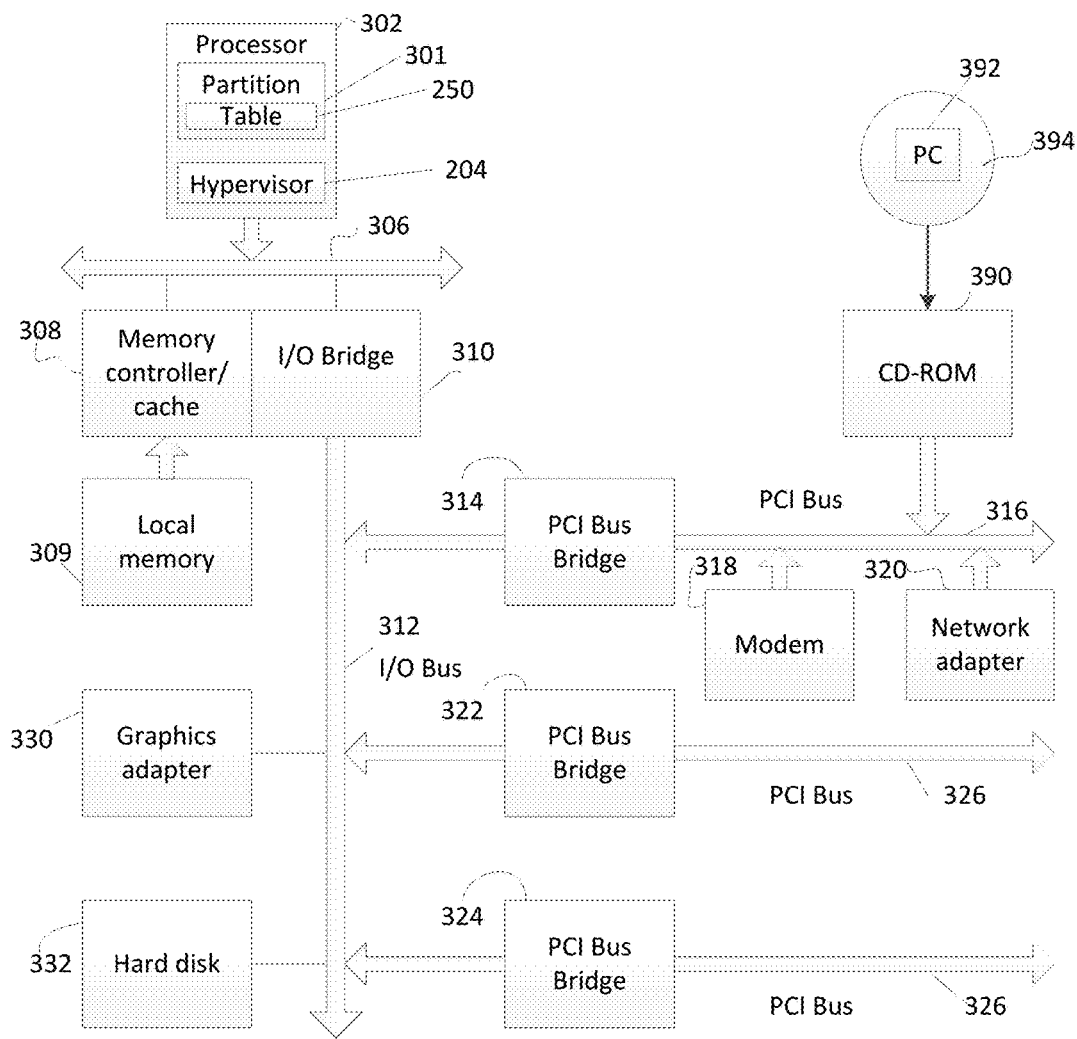
FIG. 3 illustrates an embodiment of a system that may be used to implement the concepts described herein.

Referring to FIG. 3 is an example of a system or a computer program product 392 stored on a computer readable medium such as an optical disk 394, and readable by an optical drive 390 coupled to data processing system 300. Additional examples of I/O devices include various physical and/or non-transitory media such as a semiconductor or solid state memory, magnetic tape, a random access memory (RAM), a read-only memory (ROM), a rigid magnetic disk and an optical disk.

Data processing system 300 includes a processor 302 connected to system bus 206. Also connected to system bus 306 is memory controller/cache 308 that provides an interface to local memory 309. I/O bus bridge 310 is connected to system bus 306 and provides an interface to I/O bus 312. Memory controller/cache 308 and I/O bus bridge 310 may be integrated as depicted. FIG. 3 further illustrates a partition 301, a table 250, and a hypervisor 204. The partition 301 of FIG. 3 may correspond to one or more of the partitions illustrated in FIG. 2 (e.g., one of the adjunct partitions 220-224), the page table 250 of FIG. 3 may correspond to the page table 250 illustrated in FIG. 2, and the hypervisor 204 of FIG. 3 may correspond to the page table 250 illustrated in FIG. 2. The partition 301 may be configured to access a PCI device (e.g., coupled to the PCI bus 326) via a first path based on address information stored at the page table 250 or via a second path using the hypervisor 204.

Peripheral component interconnect (PCI) bus bridge 314 connected to I/O bus 312 provides an interface to PCI local bus 316. A number of devices may be connected to PCI bus 316 through add-in boards, e.g., modem 318 and network card 320 to provide communications links to network computers. Additional PCI bus bridges 322 and 324 provide interfaces for additional PCI buses 326 and 328, from which additional devices may be supported. A memory-mapped graphics adapter 230 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply limitations with respect to the hardware implementing the concepts disclosed herein. For example, the hardware implementing the concepts may be in the form of an embedded system, e.g., in an automobile with multicore processors, and with peripheral devices in the form of GPS (global positioning system), sensors, DVD players, and the like.

Figure 4:
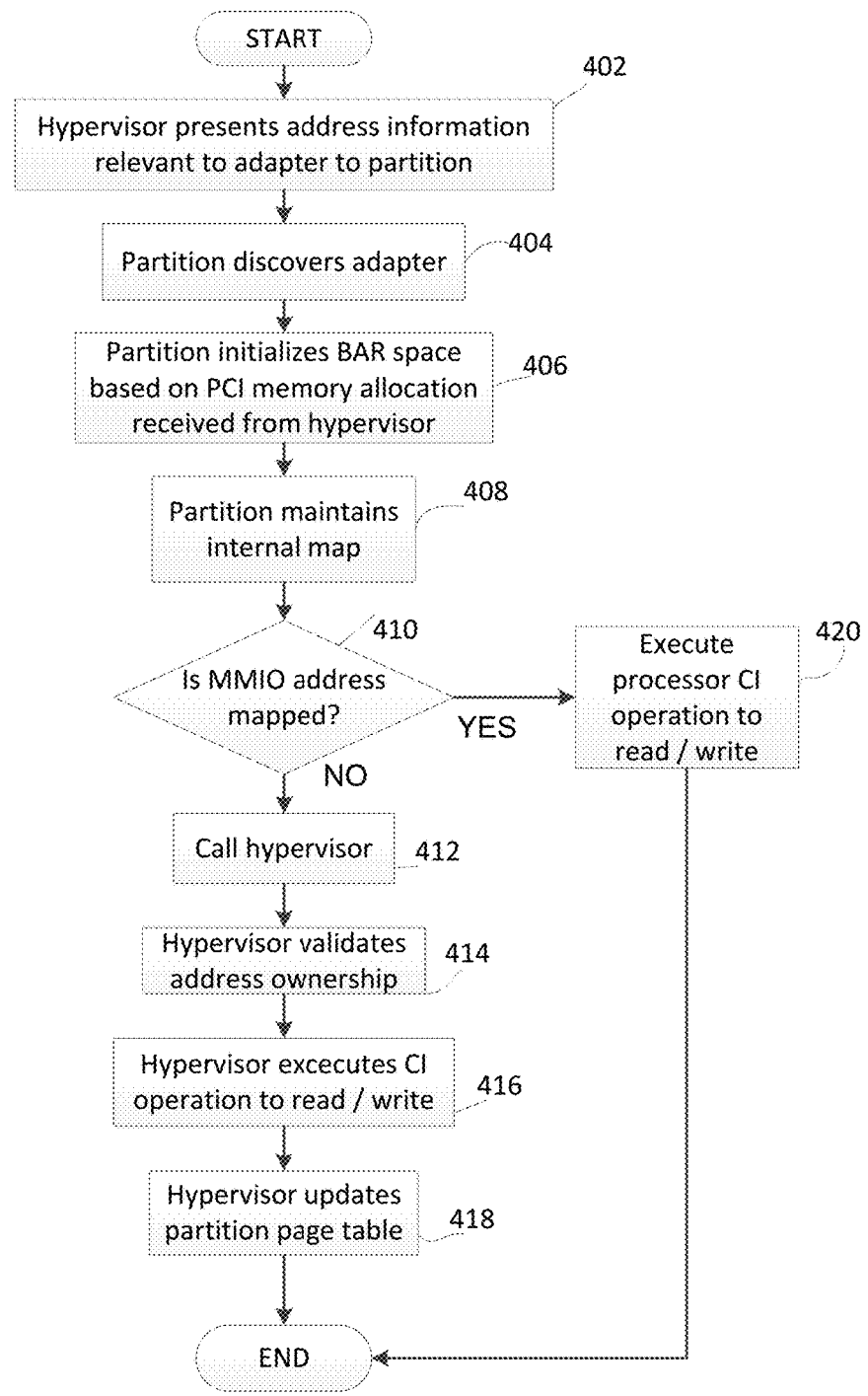
FIG. 4 is a flowchart of an embodiment of a method for a partition to access PCI memory space via any of two paths, MMIO or a hypervisor.

FIG. 4 is a flowchart of an embodiment of a method for a partition to access PCI memory space via any of two paths, MMIO or a hypervisor. A range of PCI memory space is assigned by the hypervisor for each slot or adapter in the system. At 402, the hypervisor may present to the partition address information relevant to the adapter. For example, the hypervisor may correspond to the hypervisor 204 of FIG. 2. When the partition discovers the adapter, at 404, the partition initializes the BAR space based on the PCI memory space allocation received from the hypervisor, at 406. The partition may maintain an internal map, e.g., a single address/length pair, at 408. For example, the partition may maintain the page table 250 of FIG. 2.

When the partition initiates a read or write from the PCI adapter BAR space, the partition may call an internal method at 410 to determine whether the address is within the MMIO mapped region. If the address is in the MMIO mapped region(s), the internal method may execute a processor instruction, at 420, to perform the read/write (cache initiated or CI operation) and return to the caller (end of method). For example, referring to FIGS. 1-3, a partition (e.g., of the first virtual server 112 or the second virtual server 113 of FIG. 1, one of the partitions 220-224 of FIG. 2, or the partition 301 of FIG. 3) may determine whether the address of a PCI device (e.g., the PCI device(s) 150 of FIG. 1, one of the PCI devices 205-206 of FIG. 2, or a PCI device accessible via the PCI bus 326 of FIG. 3) is within the MMIO mapped region(s). If the address is within the MMIO mapped region(s), the partition may execute a processor instruction to perform the read/write operation.

If the address is not in the MMIO mapped region(s), the internal method may call the hypervisor, at 412, for the hypervisor to perform its MMIO access. The hypervisor may validate the address for properties such as ownership, alignment, etc., at 414. Upon successful validation, the hypervisor may execute the processor instructions to perform a cache initiated (CI) operation at 416. The hypervisor may return the results to the partition at 418 to conclude the MMIO access. For example, referring to FIGS. 1-3, a partition (e.g., of the first virtual server 112 or the second virtual server 113 of FIG. 1, one of the partitions 220-224 of FIG. 2, or the partition 301 of FIG. 3) may call the hypervisor (e.g., the hypervisor 110 of FIG. 1 or the hypervisor 204 of FIGS. 2-3) for the hypervisor to perform its MMIO access.

Figure 5:
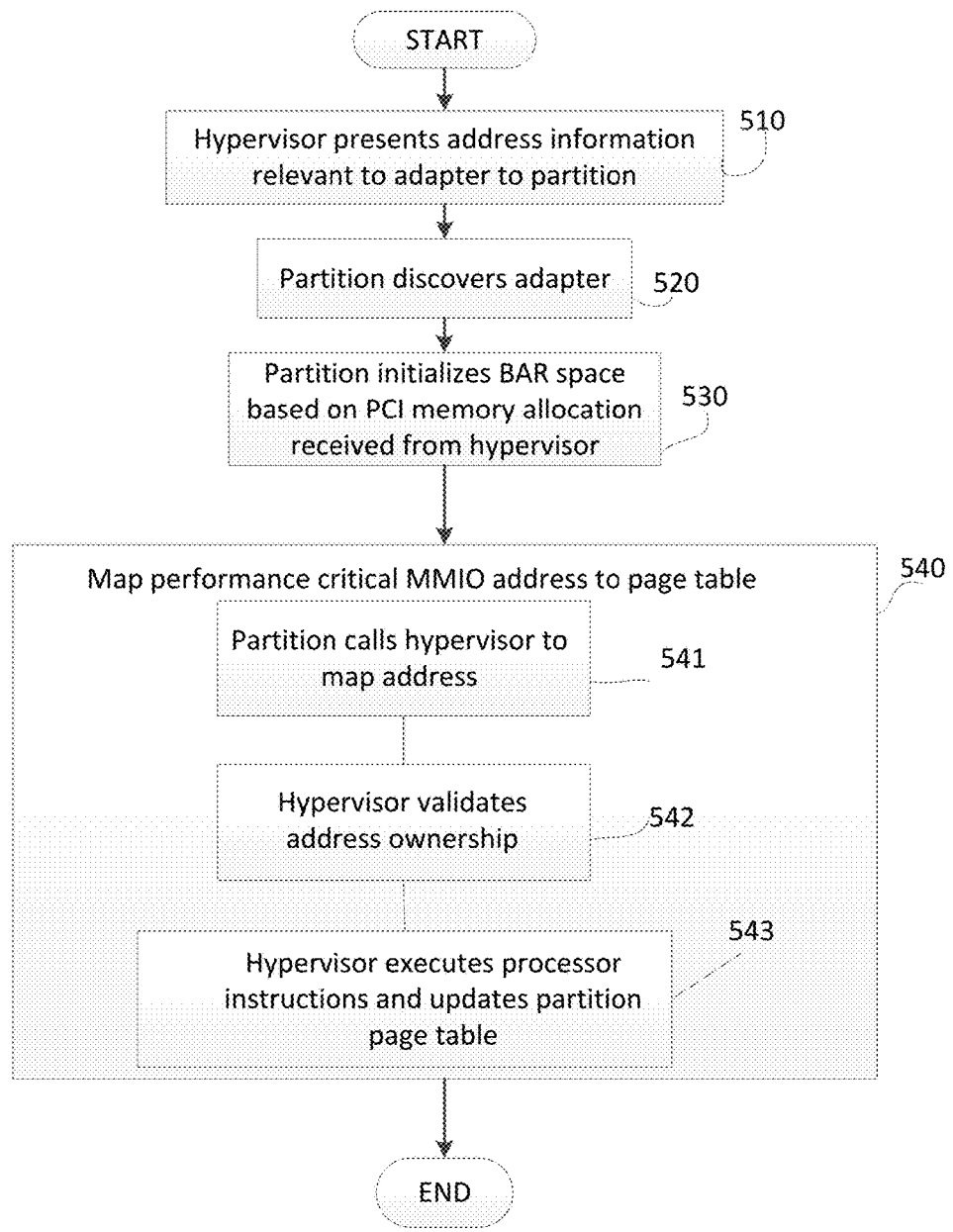
FIG. 5 is another flowchart illustrating a method for a partition to access PCI memory space via a hypervisor.

Referring to FIG. 5, a flowchart illustrates an embodiment of a method to use a partition to call a hypervisor to perform a read or write to a particular address in PCI memory space. In this process, the hypervisor may present the partition with information regarding the mappability of the address space and may indicate area(s) that are pre-mapped. As illustrated, the hypervisor first presents to the partition at 510 address information relevant to the adapter. For example, the hypervisor may correspond to the hypervisor 204 of FIG. 2, and the hypervisor 204 may present address information relevant to a particular adapter (e.g., one of the hardware I/O adapters 202-203) to a particular partition (e.g., one of the adjunct partitions 220-224). The partition may discover the adapter, at 520. The partition may initialize the BAR space at 530, based on the allocation received from the hypervisor. At 540, the partition may select (via a preset configuration), those areas of the adapter bar space that are required for performance. The hypervisor may be engaged to map required (performance critical) MMIO space to the page table with a number of steps.

The partition may call an internal method to check to see whether the address is in the MMIO mapped region(s). When the address is not in the MMIO region(s), the partition may call the hypervisor to map address, at 541. The hypervisor may validate the address ownership, at 542. The hypervisor may execute processor instruction and updates the partition page table, at 543. The internal method may return to the caller (initiator of the MMIO). For example, referring to FIGS. 1-3, a partition (e.g., of the first virtual server 112 or the second virtual server 113 of FIG. 1, one of the partitions 220-224 of FIG. 2, or the partition 301 of FIG. 3) may call the hypervisor (e.g., the hypervisor 110 of FIG. 1 or the hypervisor 204 of FIGS. 2-3) to map the address. The hypervisor (e.g., the hypervisor 110 of FIG. 1 or the hypervisor 204 of FIGS. 2-3) may validate the address ownership and execute processor instruction and update the partition table (e.g., the page table 250).

Aspects of the present disclosure may be incorporated in a system, a method, and/or a computer program product. The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, a special purpose computer, or other programmable data processing apparatus to produce a machine, such that the instructions, which execute via the processor of the computer or other programmable data processing apparatus. The machine is an example of means for implementing the functions/acts specified in the flowchart and/or block diagrams. The computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the functions/acts specified in the flowchart and/or block diagrams.

The computer-readable program instructions may also be loaded onto a computer, other programmable data processing apparatus, or other device to cause a series of operational steps to be performed on the computer, other programmable apparatus or other device to perform a computer implemented process, such that the instructions which execute on the computer, other programmable apparatus, or other device implement the functions/acts specified in the flowchart and/or block diagrams.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in a block in a diagram may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or carry out combinations of special purpose hardware and computer instructions.

Integrated circuits or chips that may be designed and/or fabricated in accordance with the described techniques can be distributed by a fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to explain the principles of the embodiments, the practical application or technical improvement over technologies found in the marketplace, or to enable others of ordinary skill in the art to understand the embodiments disclosed herein.

Those skilled in the art can make numerous uses and modifications of and departures from the apparatus and techniques disclosed herein without departing from the described concepts. For example, components or features illustrated or described in the present disclosure are not limited to the illustrated or described locations, settings, or contexts. Examples of apparatuses in accordance with the present disclosure can include all, fewer, or different components than those described with reference to one or more of the preceding figures. The present disclosure is therefore not to be limited to specific implementations described herein, but rather is to be accorded the broadest scope possible consistent with the appended claims, and equivalents thereof.

The invention claimed is:

1. A method to manage peripheral component interconnect (PCI) memory, the method comprising:
   mapping base address register (BAR) space for PCI devices with entries in a page table;
   associating the page table with a physical memory address of PCI memory to generate memory mapped I/O (MMIO);
   determining whether an address of the BAR space for PCI devices with entries in the page table is in MMIO;
   where the address of the BAR space for PCI devices with entries in the page table is not in the MMIO, invoking a hypervisor to perform read/write operations to obtain address information for entry to the page table, wherein invoking the hypervisor comprises validating by the hypervisor that a PCI device owns the address of the BAR space; and
   where the address of the BAR space for PCI devices with entries in the page table is in the MMIO, using a partition to perform read/write operations to obtain the address information for entry to the page table.

2. The method of claim 1, wherein mapping the BAR space for PCI devices with entries in the page table comprises selecting via a preset configuration area of the BAR space for mapping.

3. The method of claim 1, further comprising:
   executing processor instructions to perform read/write operations for the hypervisor to return results to a partition; and
   updating the page table by the hypervisor.

4. The method of claim 1, wherein mapping the BAR space for the PCI devices with entries in the page table comprises:
   obtaining, by the partition, a service request from a logical partition;
   presenting, to the partition, address information relevant to the PCI devices;
   initializing the BAR space based on the address information relevant to the PCI devices; and
   selecting the BAR space with entries in the page table.

5. The method of claim 4, further comprising maintaining by the partition an internal map correlating an address of the BAR space to a length size.

6. The method of claim 4, wherein the partition is employed in a single root I/O virtualization (SR-IOV) configuration to virtualize the PCI devices.

7. The method of claim 4, wherein the address information comprises PCI memory space allocation.

8. The method of claim 4, wherein the address information is pre-mapped in the MMIO.

9. The method of claim 4, wherein the address information relevant to the PCI devices mappable into a PCI memory.

10. A data processing system comprising:
    a processor comprising a logical partition and a partition;
    a plurality of peripheral component interconnect (PCI) devices coupled to the processor via a PCI bus;
    a non-transitory computer-readable storage medium comprising instructions executable by the processor to cause the partition to:
    map base address register (BAR) space for PCI devices with entries in a page table;
    maintain an internal map correlating the address of the BAR space to an address length or a page size;
    associate the page table with a physical memory address of PCI memory generating memory mapped I/O (MMIO);
    determine if an address of the BAR space for PCI devices with entries in the page table is not in MMIO;
    if the address of the BAR space for PCI devices with entries in the page table is not in the MMIO, invoke a hypervisor to perform read/write operations to obtain address information for entry to the page table; and
    if the address of the BAR space for PCI devices with entries in the page table is in the MMIO, use the partition to perform read/write operations to obtain address information for entry to the page table.

11. The data processing system of claim 10, wherein the instructions executable by the processor further comprises instructions to perform read/write operations, by the hypervisor, if the address of the BAR space for the PCI devices with entries in the page table is in the MMIO.

12. The data processing system of claim 10, wherein the instructions executable by the processor to cause the partition to map the BAR space for the PCI devices with entries in the page table comprises instructions to cause the partition to:
    obtain a service request from the logical partition;

present address information relevant to the PCI devices;
initialize the BAR space based on the address information relevant to the PCI devices; and
select the BAR space with entries in the page table.

13. The data processing system of claim 12, wherein the partition is employed in a single root I/O virtualization (SR-IOV) configuration to virtualize the PCI devices.

14. The data processing system of claim 12, wherein instructions to present the address information relevant to the PCI devices in the data processing system comprises:
   areas of the address information relevant to the PCI devices pre-mapped in the MMIO; and
   areas of the address information relevant to the PCI devices mappable into the BAR space.

15. A non-transitory computer program product comprising a computer memory having computer usable program code embodied therewith, the computer usable program code comprises instructions executable by a processor to perform operations including:
   mapping base address register (BAR) space for peripheral component interconnect (PCI) devices with entries in a page table, wherein the page table is associated with a physical memory address of PCI memory generating memory mapped I/O (MMIO), and wherein mapping the BAR space comprises:
      obtaining, by the partition, a service request from a logical partition;
      presenting, to the partition, address information relevant to the PCI devices;
      initializing the BAR space based on the address information relevant to the PCI devices; and
      selecting the BAR space with entries in the page table;
   determining whether a requested address of a PCI device has a corresponding entry in the page table;
   determining if an address of the BAR space for PCI devices with entries in the page table is not in the MMIO;
   if the address of the BAR space for PCI devices with entries in the page table is not in the MMIO invoking, a hypervisor to perform a memory operation to obtain address information; and
   if the address of the BAR space for PCI devices with entries in the page table is in the MMIO, using a partition to perform the memory operation to obtain address information.

16. The computer program product of claim 15, wherein the memory operation comprises a read operation.

17. The data processing system of claim 10, wherein invoking the hypervisor to perform the read/write operations comprises validating by the hypervisor that a PCI device owns the address of the BAR space.

18. The computer program product of claim 15, wherein invoking the hypervisor to perform the memory operation comprises validating by the hypervisor that a PCI device owns the address of the BAR space.

19. The computer program product of claim 15, wherein the partition is employed in a single root I/O virtualization (SR-IOV) configuration to virtualize the PCI devices.

20. The computer program product of claim 15, wherein instructions to present the address information relevant to the PCI devices in the data processing system comprises:
   areas of the address information relevant to the PCI devices pre-mapped in the MMIO; and
   areas of the address information relevant to the PCI devices mappable into the BAR space.

* * * * *